United States Patent [19]
Heuchert

[11] Patent Number: 5,997,797
[45] Date of Patent: *Dec. 7, 1999

[54] INJECTION MOLD INTERNAL PRESSURE EQUALIZATION SYSTEM AND METHOD

[75] Inventor: John Michael Heuchert, Macomb, Mich.

[73] Assignee: JAC Products, Inc., Ann Arbor, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,631

[22] Filed: Jun. 24, 1997

[51] Int. Cl.⁶ .................................................. B29C 45/00
[52] U.S. Cl. ...................... 264/500; 264/328.1; 425/546; 425/555
[58] Field of Search ...................... 264/500, 572, 264/328.1, 328.13; 425/130, 546, 555

[56] References Cited

U.S. PATENT DOCUMENTS

| | | | |
|---|---|---|---|
| 3,268,635 | 8/1966 | Kraus et al. | 264/500 |
| 4,092,385 | 5/1978 | Balevski et al. | 264/328.7 |
| 4,952,365 | 8/1990 | Shibuya et al. | 264/40.3 |
| 5,225,141 | 7/1993 | Hendry | 264/572 |
| 5,439,365 | 8/1995 | Hendry | 264/572 |
| 5,441,680 | 8/1995 | Guergov | 264/328.1 |
| 5,558,824 | 9/1996 | Shah et al. | 264/572 |
| 5,612,067 | 3/1997 | Kurihara et al. | 264/572 |

FOREIGN PATENT DOCUMENTS

| | | | |
|---|---|---|---|
| 2-175115 | 7/1990 | Japan | 264/500 |
| 7-314484 | 12/1995 | Japan | 264/500 |
| 94/08773 | 4/1994 | WIPO | 264/572 |

*Primary Examiner*—Catherine Timm
*Attorney, Agent, or Firm*—Harness, Dickey & Pierce, P.L.C.

[57] ABSTRACT

An injection mold system and corresponding method that equalizes pressure of flowable plastic dispensed into an injection mold cavity. A gate in communication with the mold cavity introduces a quantity of flowable plastic into the cavity at a predetermined pressure. A gas inlet in communication with the mold cavity at a mold cavity location remote from the gate introduces a gas into the mold cavity to pack the flowable plastic in the mold cavity at a pressure corresponding generally to the predetermined pressure, to thereby minimize the formation of sink marks and warpage on an injection molded part formed therein. The present invention insures formation of the part with a highly finished appearance surface and eliminates the need for painting or otherwise additional finishing of the part.

5 Claims, 1 Drawing Sheet

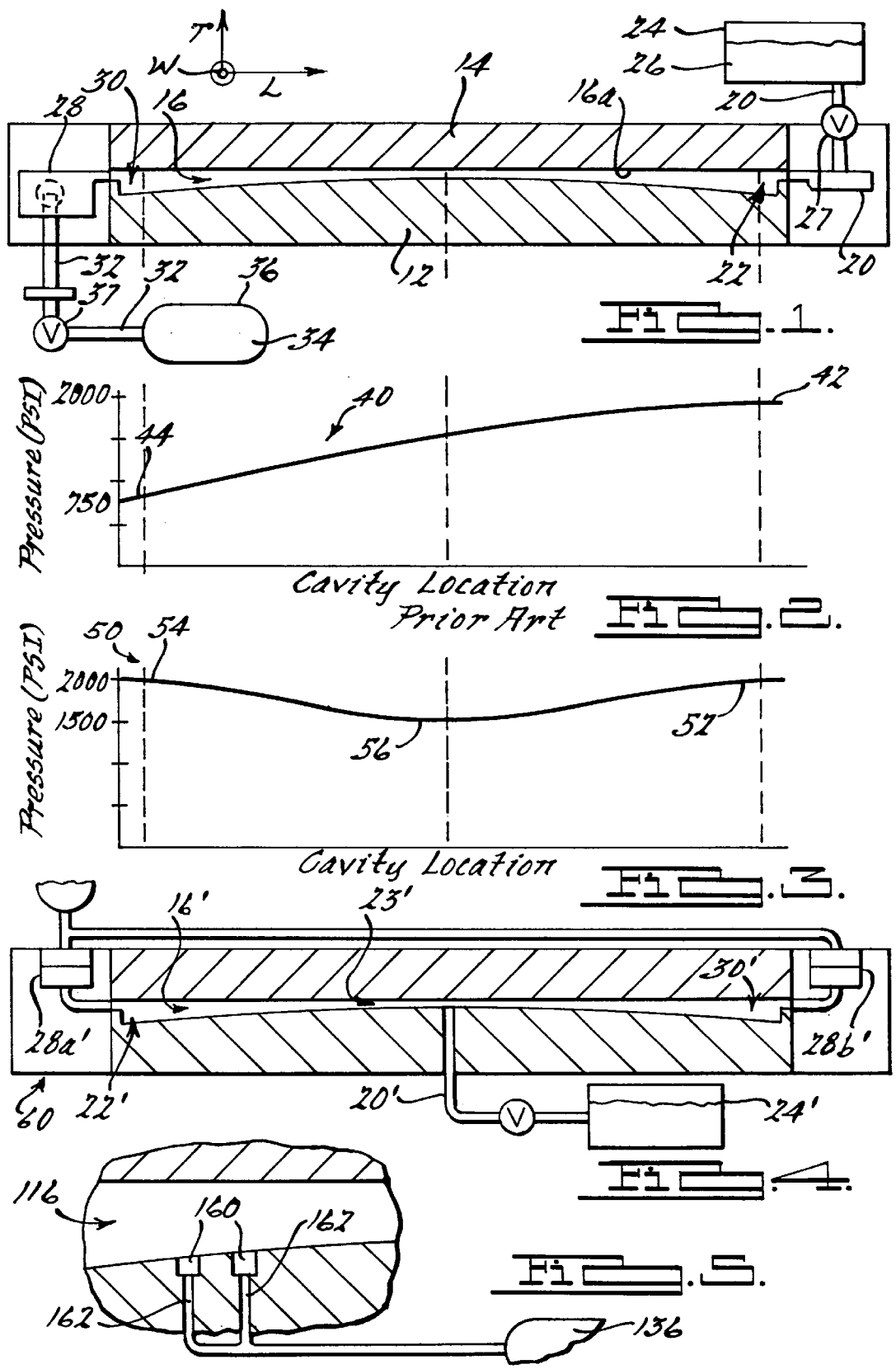

INJECTION MOLD INTERNAL PRESSURE EQUALIZATION SYSTEM AND METHOD

BACKGROUND OF THE INVENTION

The present invention relates generally to gas assisted injection molding and, more particularly, to an injection molding system and method in which flowable plastic is introduced into a mold cavity at a predetermined pressure at one location, and gas is introduced into at least one mold cavity portion remote from the first mold cavity location at a pressure corresponding to the pressure of the flowable plastic, to maintain a uniform pressure on the flowable plastic in the mold cavity during dispensing and cooling thereof.

Injection molding provides an effective method of forming plastic parts having high quality finished appearances. In conventional injection molding systems, a flowable plastic is introduced into a two-piece mold cavity at a predetermined pressure. The predetermined pressure is maintained within the mold cavity during dispensing of the flowable plastic and cooling thereof to disperse the plastic uniformly through the mold cavity to facilitate a high quality part finished appearance surface.

However, in conventional injection mold systems, and particularly in a mold cavity configured to produce a thin, elongated part, the flowable plastic material is introduced at one end of the mold cavity. As the plastic is dispensed within the cavity, the packing pressure decreases as the plastic flows further away from the dispensing gate. This drop in pressure correspondingly creates sink marks and warps in the finished part. Thus, the appearance side of the part must either be painted or the part must be discarded, thereby increasing production costs.

One conventional solution to the above problem is to introduce the thermoplastic into the mold cavity at a higher packing pressure than would otherwise be required. Therefore, as the flowable plastic is dispensed within the cavity, the plastic dispensed into a mold portion remote from the gate is maintained at or near a target pressure. However, the increased gate pressure causes the pressure on the plastic dispensed in proximity to the gate to be maintained at a higher than necessary pressure, which in turn increases the stress and strain on the plastic. This increased stress and strain causes stress and strain marks to form on the part appearance surfaces at these locations, thereby detracting from part appearance and resulting in the part appearance side having to be refinished or the part to be discarded altogether.

Another conventional approach to overcoming the above problem is to introduce gas internally into the flowable plastic and mold portions remote from the gate. By internally introducing gas at these locations, the plastic packed against the mold cavity walls, and the problems associated with introducing the flowable plastic at higher than necessary gate pressures, is avoided. By introducing gas internally into the flowable plastic, the plastic is packed at appropriate pressures throughout the mold cavity. However, gas channels are also created within the part being formed. Such a method is thus not desirable in the formation of many parts, especially elongated parts having minimal thicknesses, as the gas channels tend to lessen the structural integrity of such parts.

Therefore, in view of the above, there is a need for a gas assisted injection molding system that maintains relatively uniform packing pressure distribution on the flowable plastic dispensed into the mold cavity during dispensing of the plastic into the mold cavity and during formation of the part therein to minimize sink mark formation and stress placed on plastic introduced through the gate.

SUMMARY OF THE INVENTION

In accordance with the teachings of the present invention, an injection molding system and method is provided for forming an injection molded part having a sink-free, strain free appearance surface. The system and method of the present invention allow a uniform packing pressure to be maintained on flowable plastic introduced into a mold cavity by backpacking the flowable plastic in remote mold portions at a pressure corresponding to the pressure of the flowable plastic as it is introduced into the mold cavity. The system and method of the present invention thereby minimize part production costs by eliminating the need to further finish the part appearance side due to sink marks or strain marks subsequent to part ejection from the mold.

More particularly, an injection mold apparatus is provided that defines a mold cavity. A gate in communication with the mold cavity is operative for introducing a quantity of flowable plastic into the cavity at a predetermined pressure. Further, a gas inlet is in communication with the mold cavity at a location remote from the gate. The inlet introduces a gas into the mold cavity to pack the flowable plastic in the mold cavity at a packing pressure corresponding generally to the predetermined pressure, to thereby minimize the formation of sink marks and warpage on an injection molded part formed therein.

In addition, the present invention provides a method of forming an injection molded part that minimizes part warpage and formation of sink marks therein. The method includes the step of providing an injection mold defining a mold cavity. The method also includes the step of introducing a flowable plastic into the mold cavity at a predetermined pressure in a first mold cavity location. The method also provides the step of introducing a gas at a second mold cavity location remote from the first cavity location to maintain the predetermined pressure on the flowable plastic in the mold cavity, thereby maintaining the flowable plastic against the inner surfaces of the mold cavity for formation of an injection molded part having a Class A appearance surface.

BRIEF DESCRIPTION OF THE DRAWINGS

FIG. 1 is a side elevational view of an injection molding system according to a first preferred embodiment of the present invention;

FIG. 2 is a graph illustrating packing pressure within the mold cavity along the length of the part being formed therein without packing gas being introduced into the cavity;

FIG. 3 is a graph illustrating packing pressure on the flowable plastic within the mold cavity along the length of the part being formed therein with packing gas being introduced into the cavity;

FIG. 4 is a side elevational view of a second preferred embodiment of the present invention; and FIG. 5 is an isolated side cross-sectional view of a mold cavity according to a third preferred embodiment of the present invention.

DETAILED DESCRIPTION OF THE PREFFERED EMBODIMENTS

Referring to FIG. 1, a side cross-sectional view of an injection molding system according to a preferred embodiment of the present invention is shown generally at 10. The system includes mold portions 12, 14 that, when selectively clamped together form a mold cavity 16 with a defined inner surface 16a. The mold cavity 16 may be of any desired dimensions. However, for purposes of the present invention, it is contemplated that the mold cavity may be configured to form an elongated injection molded part whose length is substantially greater than its width or height. For example, referring to FIG. 1, the dimensions of the mold cavity may be 1778 mm in length (L), 100 mm in width (W) (in a direction into the plane of the paper) and 4.5 mm in thickness (T).

A gate 20 communicates with the mold cavity 16 at a first end 22 of the mold cavity. The gate is coupled to a flowable plastic supply 24 to deliver flowable plastic 26, such as ABS, polyester or nylon, from the supply to the mold cavity when the flowable plastic is selectively dispensed from the supply through gate control 27. A gas post pack well 28 communicates with the mold cavity 16 at a second cavity end 30 remote from the first cavity end as shown. A gas line 32 in turn communicates with the post pack well 28 to selectively supply gas 34 into the post pack well 28 at a predetermined pressure selectively when delivered from a remote gas supply 36 through gas line control 37. All other mold components are of the type used in conventional injection molding applications.

Still referring to FIG. 1, operation of the injection mold internal pressure equalization system of the present invention will now be described. When it is desired to form an injection molded part in the mold cavity 16, gate control 27 is selectively actuated, either manually or electronically, to open the gate 20. As the gate 20 opens, the flowable plastic is dispensed from the flowable plastic supply 24 through the gate 20 at a predetermined pressure, which is typically in the range of 1,000 pounds per square inch (psi) to 4,000 psi, thereby insuring distribution of the flowable plastic throughout the mold cavity 16. The flowable plastic is thus dispensed into the mold cavity 16 at the first end 22 thereof. Due to the pressurization of the flowable plastic 26, the plastic disperses throughout the cavity. Absent implementation of the pressure equalization system and method of the present invention, the flowable plastic pressurization decreases as the flowable plastic increases in distance from the dispensing gate.

FIG. 2 graphically illustrates the decrease in pressure of the flowable plastic as is dispensed into the mold cavity 16 and throughout, as shown generally at 40. The horizontal axis of the graph corresponds to the length of the cavity shown in FIG. 1. At 42, the gas is introduced through the gate into the cavity at the first end 22 at, for example, 2,000 psi, as shown at 42. The pressurization of the plastic decreases as the plastic flows from the gate, reaching a minimum value such as, for example, 750 psi at the second end 30 of the cavity, as shown at 44 in FIG. 2. As a result, the part formed in the mold cavity is more susceptible to sink marks and warpage, as the plastic is not held against the inner surfaces 16a of the mold cavity portions in a pressurized manner as well as the flowable plastic at the first end 22. As a result, the appearance side of the part must be painted or otherwise finished, thereby increasing cost of production of the part.

However, by implementing the internal pressure equalization system of the present invention, sink marks and warpage on the part formed in the mold cavity are minimized as flowable plastic pressurization is maintained throughout the mold cavity as the plastic is dispensed. Referring to FIG. 1, as the flowable plastic is dispensed through the gate 20 into the first end 22 of the mold cavity, the flowable plastic disperses throughout the mold cavity 16. After the mold cavity has been substantially filled with the flowable plastic, and the flowable plastic begins to spill over into the gas post pack well 28, the gas supply valve 37 is either manually or electronically opened. Gas from the gas supply 36 is then supplied through the gas line 32 into the gas post pack well. The gas is pressurized at substantially the same pressure as the flowable plastic. Therefore, the pressurized gas packs the overflow plastic, which is initially at a substantially lower pressure than the flowable plastic being supplied at the first end of the mold portion, back into the mold cavity at the second end 30. The gas elevates the pressure of the flowable plastic at the second end 30 to a level approaching that of the flowable plastic at the first end 22. Therefore, the flowable plastic is maintained against the mold cavity inner surfaces 16a. The resulting formed plastic part thereby exhibits fewer shadow marks and less warpage than parts formed without the internal gas pressure equalization method of the present invention. The formed parts thus typically exhibit a Class A appearance surface finish and do not require additional painting or finishing before being used.

FIG. 3 shows generally at 50 the pressure of the flowable plastic as the plastic is distributed throughout the mold cavity in conjunction with the internal gas pressurization system of the present invention. The flowable plastic pressurization at the first end 22 is almost identical to the flowable plastic pressurization at the second end 30, as shown at 52 and 54, respectively. The flowable plastic pressurization is somewhat less than that at the first and second ends 22, 30 in the middle of the mold portion, indicated by reference numeral 56. However, the pressurization remains high enough to minimize the formation of sink marks and warpage.

Referring to FIG. 4, a second embodiment of the internal gas pressurization system of the present invention is shown generally at 60. In the system shown at 60, the gate 20 is centrally located with respect to the mold cavity 16'. Therefore, flowable plastic from a remote supply 24' is dispensed initially into a central portion 23' of the mold cavity. In this configuration, two post pack wells 28a', 28b' are each located at respective ends 22', 30' of the mold cavity and function to maintain pressure of flowable plastic dispensed through the gate 20' at both cavity ends in a manner identical to that described in conjunction with the post pack well 28 in FIG. 1. Therefore, flowable plastic pressurization remains substantially uniform as the flowable plastic is centrally dispensed into the cavity 16'.

At this point, it should be appreciated that the gas post pack well 28 and post pack wells 28a', 28b' effectively act as packing rams at the end or ends of the mold cavity. These gas packing rams are effective in maintaining equalized pressure on the flowable plastic throughout the mold cavity with less associated expense when compared to conventional hydraulic rams.

Referring to FIG. 5, a mold cavity 116 may also include a cavity or cavities 160 that define a boss or bosses on the injection molded part as is well known in the art. Cavities 160 present an additional portion of the mold cavity in which pressure must be maintained at or substantially near the pressure at which the flowable plastic is introduced into the cavity. Therefore, additional gas nozzles, such as the nozzles 162 shown in FIG. 5, are operatively located within each cavity 160 and are connected to a remote gas source 136. Gas from the remote gas source 136 is selectively introduced into the cavities 160 as the flowable plastic is introduced into the cavity to maintain plastic within the cavities 160 at substantially the same pressure as the flowable plastic being initially dispensed into the cavity 116. Sink marks and warpage of the portions of the formed injection molded part are thereby minimized with respect to the boss portions of the part.

From the foregoing description, it should be appreciated that the injection mold internal pressure system of the present invention provides an effective method of maintaining substantially uniform pressure on flowable plastic material introduced into a mold cavity during an injection molding process. Through the implementation of the gas post pack well and/or additional gas inlets strategically located throughout the mold cavity with respect to the flowable plastic inlet, a substantially uniform internal pressure may be maintained on the flowable plastic as the injection molded part is formed. The internal pressure equalization system of the present invention thereby minimizes formation of sink marks and warpage in the finished part. The system is also less expensive to implement than conventional hydraulic packing rams.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A method of forming an injection molded part that minimizes part warpage and formation of sink marks therein, comprising the steps of:

providing an injection mold defining a mold cavity;

introducing a quantity of flowable plastic into said mold cavity at a first predetermined pressure at a first mold cavity location;

after said mold cavity is substantially filled with said flowable plastic, and a portion of said quantity of flowable plastic has flowed into a post pack well, introducing a gas into said pack well, wherein said pack well is spaced apart from said first mold cavity location to urge said quantity of flowable plastic out of said pack well, to thereby maintain said flowable plastic under a pressure in said mold cavity approximately equal to said first predetermined pressure, thereby maintaining said flowable plastic against at least one inner surface of said mold cavity at substantially the same pressure along said inner surface to thereby form an injection molded part having a Class A appearance surface.

2. The method of claim 1 further including a step of introducing a gas at a second mold cavity location comprising introducing said gas into a mold cavity boss defining location.

3. The method of claim 1 further including a step of introducing a gas at a second mold cavity location comprising introducing said gas into a plurality of mold cavity boss defining locations.

4. The method of claim 1, wherein said step of introducing a flowable plastic into said mold cavity at a predetermined pressure at a first mold cavity location comprises introducing a flowable plastic material at a central mold cavity location between two opposing end locations, there being a post pack well at each end, and wherein said step of introducing a gas into said post pack well comprises introducing gas into said post pack wells located at the opposing ends of said mold cavity.

5. A method of forming an injection molded part that minimizes part warpage and formation of sink marks therein, said method comprising the steps of:

providing an injection mold defining a mold cavity;

introducing a quantity of flowable plastic into said mold cavity at a first predetermined mold location and under a predetermined pressure;

causing said quantity of flowable plastic to substantially fill said mold cavity and spill over out of said mold cavity into a gas post pack well disposed at a second location on said mold tool, wherein said second location is spaced apart from said first location;

applying a gas under pressure to said portion of said quantity of flowable plastic residing within said gas post pack well to force said portion back into said mold cavity;

said pressure applied to said portion of said flowable quantity of plastic being such as to assist in maintaining said quantity of flowable plastic under a relatively constant pressure across a full length of said mold cavity, to thereby substantially eliminate sink marks in said molded part.

\* \* \* \* \*